(12) United States Patent
Yang et al.

(10) Patent No.: US 10,447,263 B2
(45) Date of Patent: Oct. 15, 2019

(54) ELECTRONIC DEVICE AND METHOD THEREOF FOR GRIP RECOGNITION

(71) Applicant: Samsung Electronics Co., Ltd., Gyeonggi-do (KR)

(72) Inventors: Dongil Yang, Gyeonggi-do (KR); Wonsub Lim, Gyeonggi-do (KR); Daeyoung Kim, Seoul (KR); Sunah Park, Gyeonggi-do (KR); Seunghyun Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 27 days.

(21) Appl. No.: 15/679,550

(22) Filed: Aug. 17, 2017

(65) Prior Publication Data

US 2018/0054196 A1   Feb. 22, 2018

(30) Foreign Application Priority Data

Aug. 18, 2016   (KR) ........................ 10-2016-0104827

(51) Int. Cl.
*H03K 17/96* (2006.01)
*H04W 4/80* (2018.01)
(Continued)

(52) U.S. Cl.
CPC ......... *H03K 17/962* (2013.01); *G06F 1/1626* (2013.01); *G06F 1/1684* (2013.01);
(Continued)

(58) Field of Classification Search
CPC .. H03K 17/962; H04W 52/0254; H01Q 1/243
(Continued)

(56) References Cited

U.S. PATENT DOCUMENTS 6,252,461 B1   6/2001   Raab
7,271,576 B1   9/2007   O'Harra, II
(Continued)

FOREIGN PATENT DOCUMENTS

JP   2014007629   1/2014
JP   2014-127755   7/2014
(Continued)

OTHER PUBLICATIONS

International Search Report dated Nov. 27, 2017 issued in counterpart application No. PCT/KR2017/008976, 3 pages.
(Continued)

*Primary Examiner* — Ayodeji O Ayotunde
(74) *Attorney, Agent, or Firm* — The Farrell Law Firm, P.C.

(57) ABSTRACT

An electronic device and a method of grip recognition of the electronic device are provided. The electronic device includes an antenna, a radio communication device having a coupler, a memory, and a processor which is electrically connected to the radio communication device and the memory, wherein the memory includes instructions, executable by the processor, wherein the processor is configured to detect a first signal being transmitted and a second signal being received through the antenna using the coupler, calculate a reflection coefficient of the antenna based on the first signal and the second signal, determine a signal magnitude and a phase corresponding to the reflection coefficient, and determine whether the electronic device is being gripped based on the signal magnitude and the phase.

20 Claims, 14 Drawing Sheets

(51) Int. Cl.
    *G06F 1/16*         (2006.01)
    *H01Q 1/24*        (2006.01)
    *H04B 5/00*        (2006.01)
    *H04M 1/725*      (2006.01)
    *H04W 52/02*      (2009.01)
    *H04B 1/04*        (2006.01)
    *G01R 1/02*        (2006.01)
    *H04B 1/00*        (2006.01)
    *H04W 12/06*      (2009.01)
    *H04B 1/3827*     (2015.01)

(52) U.S. Cl.
CPC ........... *H01Q 1/243* (2013.01); *H04B 1/0458* (2013.01); *H04B 5/0031* (2013.01); *H04B 5/0056* (2013.01); *H04M 1/72569* (2013.01); *H04W 4/80* (2018.02); *H04W 52/0254* (2013.01); *G01R 1/025* (2013.01); *H03K 2217/94089* (2013.01); *H03K 2217/960775* (2013.01); *H04B 1/006* (2013.01); *H04B 1/3838* (2013.01); *H04W 12/06* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/20* (2018.01); *Y02D 70/26* (2018.01); *Y02D 70/42* (2018.01)

(58) Field of Classification Search
USPC ......................................................... 455/107
See application file for complete search history.

(56) References Cited

U.S. PATENT DOCUMENTS

| | | |
|---|---|---|
| 9,166,551 B2 | 10/2015 | Lee et al. |
| 2004/0066341 A1* | 4/2004 | Ito .......................... H01Q 1/243 |
| | | 343/702 |
| 2006/0139034 A1* | 6/2006 | Nevermann ............. G01D 5/48 |
| | | 324/644 |
| 2008/0186032 A1 | 8/2008 | Van Bezooijen et al. |
| 2013/0183910 A1 | 7/2013 | Bavisi et al. |
| 2014/0128032 A1 | 5/2014 | Muthukumar |
| 2014/0170996 A1 | 6/2014 | Chung |
| 2014/0210686 A1 | 7/2014 | Ali et al. |
| 2015/0296065 A1 | 10/2015 | Narita et al. |
| 2016/0036482 A1 | 2/2016 | Black et al. |
| 2016/0076952 A1 | 3/2016 | Kim |
| 2016/0173172 A1 | 6/2016 | Greene |
| 2016/0217645 A1 | 7/2016 | Seitz et al. |

FOREIGN PATENT DOCUMENTS

| | | |
|---|---|---|
| JP | 2015-162018 | 9/2015 |
| KR | 1020160030752 | 3/2016 |
| WO | WO 2006/030360 | 3/2006 |
| WO | WO 2013/015572 | 1/2013 |

OTHER PUBLICATIONS

European Search Report dated Jun. 11, 2019 issued in counterpart application No. 17841700.2-1203, 8 pages.

\* cited by examiner

FIG. 7C $$\Gamma_{in} = \frac{S_{31}\frac{b_4}{b_3} - S_{41}}{(S_{42}S_{21} - S_{41}S_{22}) - (S_{32}S_{21} - S_{31}S_{22})\frac{b_4}{b_3}}$$

FIG. 8A

| Mag | phase | I | Q | |
|---|---|---|---|---|
| 0.0 | 0.0 | −5419 | −4204 | — 801 |
| 0.40 | 0.0 | −5117 | −2287 | |
| 0.40 | 45.0 | −4800 | −1002 | |
| 0.40 | 90.0 | −5152 | 1173 | |
| 0.40 | 135.0 | −2940 | 2192 | |
| ⋮ | | | | |
| 0.80 | 225.0 | 534 | −4378 | |
| 0.80 | 270.0 | −2039 | −4671 | |
| 0.80 | 315.0 | −1193 | −9459 | — 803 |

800

ELECTRONIC DEVICE AND METHOD THEREOF FOR GRIP RECOGNITION

PRIORITY

This application claims priority under 35 U.S.C. § 119(a) to a Korean Patent Application filed on Aug. 18, 2016 in the Korean Intellectual Property Office and assigned Ser. No. 10-2016-0104827, the entire disclosure of which is incorporated herein by reference.

BACKGROUND

1. Field of the Disclosure

The present disclosure relates generally to an electronic device and method thereof for grip recognition, and more particularly, to an electronic device and method for grip recognition that is capable of measuring a reflection coefficient of an antenna of the electronic device to recognize a user's grip based on the measured reflection coefficient.

2. Description of the Related Art

With the growing use of portable electronic devices, the regulation of electromagnetic waves produced by antennas of the portable electronic devices has been reinforced.

Typically, a portable electronic device is equipped with many parts for reducing the electromagnetic waves produced by its antenna. Certain portable electronic devices may be equipped with a grip sensor for the purpose of recognizing a user's grip therearound. The grip sensor-equipped portable electronic devices may be configured to enable an electromagnetic wave reduction function if the user's grip is recognized.

Typically, grip sensor-equipped portable electronic devices are each capable of recognizing a user's grip based on data gathered by the grip sensor.

In addition, certain portable electronic devices may each be equipped with a proximity sensor for the purpose of recognizing an approach of an object thereto. The proximity sensor-equipped portable electronic devices may each be configured to enable an electromagnetic wave reduction function if an approach of an object thereto is detected.

A grip sensor adopted for the purpose of enabling an electromagnetic wave reduction function of a portable electronic device is formed with a plurality of parts. For example, a portable electronic device may be equipped with a grip sensor formed with a plurality of capacitors to determine whether it is in the state of being gripped based on the amount of change in capacitance of each of the capacitors. However, such a configuration of a grip sensor may cause antenna performance degradation because of the use of multiple capacitors. That is, a large number of capacitors required to form a grip sensor may cause performance degradation of an antenna of a portable electronic device. In addition, an increase in the number of components, i.e., capacitors, required to form a grip sensor may increase the total manufacturing cost of a portable electronic device.

SUMMARY

An aspect of the present disclosure provides an electronic device and method therefor for grip recognition that is capable of measuring a reflection coefficient of an antenna of the electronic device to recognize a user's grip based on the measured reflection coefficient.

Another aspect of the present disclosure provides an electronic device and method thereof for grip recognition that is capable of recognizing a user's grip based on a reflection coefficient of an antenna of the electronic device without a grip sensor. In accordance with an aspect of the present disclosure, an electronic device is provided. The electronic device includes an antenna, a radio communication device having a coupler, a memory, and a processor which is electrically connected to the radio communication device and the memory, wherein the memory includes instructions, executable by the processor, wherein the processor is configured to detect a first signal being transmitted and a second signal being received through the antenna using the coupler, calculate a reflection coefficient of the antenna based on the first signal and the second signal, determine a signal magnitude and a phase corresponding to the reflection coefficient, and determine whether the electronic device is being gripped based on the signal magnitude and the phase.

In accordance with another aspect of the present disclosure, a method of grip recognition of an electronic device is provided. The includes detecting a first signal being transmitted and a second signal being received through an antenna using a coupler, calculating a reflection coefficient of the antenna based on the first signal and the second signal, determining a signal magnitude and a phase corresponding to the reflection coefficient, and determining whether the electronic device is being gripped based on the signal magnitude and phase.

BRIEF DESCRIPTION OF THE DRAWINGS

The above and/or other aspects, features, and advantages of the present disclosure will be more apparent from the following description, taken in conjunction with the accompanying drawings, in which:

FIG. 7C is an illustration of a reflection coefficient equation according to an embodiment of the present disclosure;

FIG. 8A is a diagram of a lookup table mapping reflection coefficient values to signal magnitude and phase values according to various embodiments of the present disclosure;

DETAILED DESCRIPTION OF EMBODIMENTS OF THE PRESENT DISCLOSURE

Figure 1:
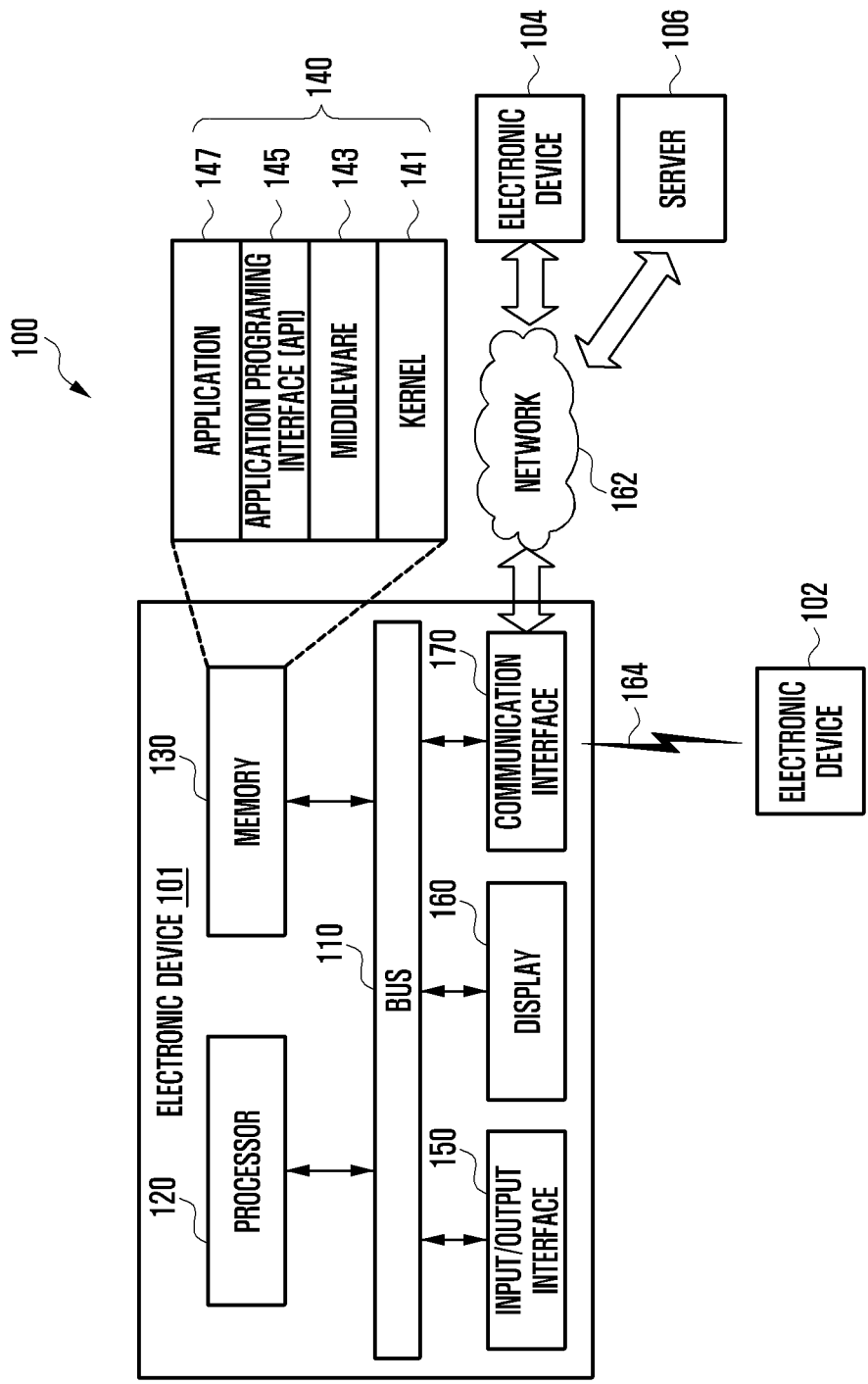
FIG. 1 is a block diagram of an electronic device in a network environment according to an embodiment of the present disclosure.

Hereinafter, the present disclosure is described with reference to the accompanying drawings. Although certain embodiments are illustrated in the accompanying drawings and related details are described in the present disclosure, the present disclosure may have various modifications and embodiments. However, the various embodiments of the present disclosure are not limited to a certain implementation form and it is intended to be understood that the present disclosure includes all changes, equivalents and substitutes included in the scope and spirit of the present disclosure. In connection with the descriptions of the accompanying drawings, similar components are designated by the same reference numeral.

In various embodiments of the present disclosure, terms such as "include", "have", "may include" or "may have" may be construed to denote a certain characteristic, number, step, operation, element, component or a combination thereof, but are not intended to be construed to exclude the existence of or a possibility of addition of one or more other characteristics, numbers, steps, operations, constituent elements, components or combinations thereof.

In an embodiment of the present disclosure, the expressions "or" and "at least one of A and/or B" include any and all combinations of the words listed together. For example, the expressions "A or B" and "at least A and/or B" may include A, B, or both A and B.

The expressions "1", "2", "first", and "second" used in the present disclosure may modify components of an embodiment of the present disclosure but do not limit the corresponding components. For example, the above expressions do not limit the sequence and/or importance of the components. The expressions may be used for distinguishing one component from another component. For example, a first user device and a second user device indicate different user devices although both of them are user devices. For example, without departing from the scope of the present disclosure, a first structural element may be referred to as a second structural element. Similarly, a second structural element may be referred to as a first structural element.

If it is stated that a component is "(operatively or communicatively) coupled to" or "connected to" another component, the component may be directly coupled or connected to the other component or a new component may exist between the component and the other component. In contrast, if it is stated that a component is "directly coupled to" or "directly connected to" another component, a new component does not exist between the component and the other component. In the present disclosure, the expression "configured (or set) to do" may be used interchangeable with, for example, the expressions "suitable for doing," "having the capacity to do," "designed to do," "adapted to do," "made to do," and "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a general purpose processor (e.g., a central processing unit (CPU) or application processor (AP)) that may execute one or more software programs stored in a memory device to perform corresponding functions.

An electronic device according to an embodiment of the present disclosure may be a device including an antenna. For example, an electronic device may be a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), a moving picture experts group audio layer 3 (MP3) player, a mobile medical application, a camera, and a wearable device (for example, a head-mounted-device (HMD), such as electronic glasses, electronic clothes, an electronic bracelet, an electronic necklace, an electronic appcessary, an electronic tattoo, and a smart watch).

According to an embodiment of the present disclosure, an electronic device may be a smart home appliance having an antenna. A smart home appliance may include a television (TV), a digital video disk (DVD) player, an audio player, an air conditioner, a cleaner, an oven, a microwave oven, a washing machine, an air purifier, a set-top box, a TV box (for example, Samsung HomeSync®, Apple TV®, or Google TV™), game consoles, an electronic dictionary, an electronic key, a camcorder, and an electronic frame.

According to an embodiment of the present disclosure, an electronic device may include various types of medical devices (for example, a magnetic resonance angiography (MRA) device, a magnetic resonance imaging (MRI) device, a computed tomography (CT) device, a scanner, an ultrasonic device and the like), a navigation device, a global positioning system (GPS) receiver, an event data recorder (EDR), a flight data recorder (FDR), a vehicle infotainment device, electronic equipment for a ship (for example, a navigation device for a ship, a gyro compass and the like), avionics, a security device, a head unit for a vehicle, an industrial or home robot, an automated teller machine (ATM) of a financial institution, a point of sale (POS) device of a shop, and an Internet of things (IoT) device.

According to an embodiment of the present disclosure, an electronic device may include furniture or a part of a building/structure, an electronic board, an electronic signature receiving device, a projector, and various types of measuring devices (for example, a water meter, an electricity meter, a gas meter, a radio wave meter and the like), which are equipped with an antenna. An electronic device may also be a combination of the devices listed above. Further, an electronic device may be a flexible device. It is apparent to those skilled in the art that an electronic device is not limited to the above described devices.

Hereinafter, an electronic device according to an embodiment of the present disclosure is described with reference to the accompanying drawings.

FIG. 1 is a block diagram of an electronic device 101 in a network environment 100 according to an embodiment of the present disclosure.

Referring to FIG. 1, the electronic device 101, electronic device 102, and electronic device 104 may connect to a server 106 via a network 162 or short-range wireless communication 164. The electronic device 101 may include a bus 110, a processor 120, a memory 130, an input/output interface 150, a display 160, and a communication interface 170. At least one of the above described components may be omitted from the electronic device 101 or another component may be further included in the electronic device 101.

The bus 110 may be a circuit connecting the above-described components 120, 130, and 150-170 and transmitting communications (e.g., control messages and/or data) between the above-described components.

The processor 120 is capable of including one or more of the following: a CPU, an AP, and a communication processor (CP). The processor 120 is capable of controlling at least one of the other components of the electronic device 101 and/or processing data or operations related to communication.

The memory 130 is capable of including volatile memory and/or non-volatile memory. The memory 130 is capable of storing data or commands related to at least one of the other components of the electronic device 101. According to an embodiment of the present disclosure, the memory 130 is capable of storing software and/or a program module 140. For example, the program module 140 is capable of including a kernel 141, middleware 143, an application programming interface (API) 145, an application programs (or applications) 147, etc. The kernel 141, the middleware 143 and at least a part of the API 145 may be referred to as an operating system (OS).

The kernel 141 is capable of controlling or managing system resources (e.g., the bus 110, the processor 120, the memory 130, etc.) used to execute operations or functions of other programs (e.g., the middleware 143, the API 145, and the applications 147). The kernel 141 provides an interface capable of allowing the middleware 143, the API 145, and the applications 147 to access and control/manage the individual components of the electronic device 101.

The middleware 143 is capable of mediating between the API 145 or the applications 147 and the kernel 141 so that the API 145 or the applications 147 can communicate with the kernel 141 and exchange data therewith. The middleware 143 is capable of processing one or more task requests received from the applications 147 according to a priority. For example, the middleware 143 is capable of assigning a priority for use of system resources of the electronic device 101 (e.g., the bus 110, the processor 120, the memory 130, etc.) to at least one of the applications 147. For example, the middleware 143 processes one or more task requests according to a priority assigned to at least one application program, thereby performing scheduling or load balancing for the task requests.

The API 145 refers to an interface configured to allow the applications 147 to control functions provided by the kernel 141 or the middleware 143. The API 145 is capable of including at least one interface or function (e.g., instructions) for file control, window control, image process, text control, and the like.

The input/output interface 150 is capable of transferring instructions or data, received from a user or external devices, to one or more components of the electronic device 101. The input/output interface 150 is capable of outputting instructions or data, received from one or more components of the electronic device 101, to the user or the external devices.

The display 160 is capable of including a liquid crystal display (LCD), a flexible display, a transparent display, a light emitting diode (LED) display, an organic LED (OLED) display, a micro-electro-mechanical systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 is capable of establishing communication between the electronic device 101 and an external device (e.g., the first external device 102, the second electronic device 104, and the server 106). For example, the communication interface 170 is capable of communicating with the second external device 104 or the server 106 connected to the network 162 via wired or wireless communication.

Wireless communication may employ, as a cellular communication protocol, long-term evolution (LTE), LTE advanced (LTE-A), code division multiple access (CDMA), wideband CDMA (WCDMA), universal mobile telecommunications system (UMTS), wireless broadband (WiBro), and a global system for mobile communication (GSM). Wireless communication may also include short-range wireless communication 164. Short-range wireless communication 164 may include wireless fidelity (Wi-Fi), Bluetooth (BT), near field communication (NFC), magnetic secure transmission (MST), and a global navigation satellite system (GNSS). The GNSS may include GPS, a global navigation satellite system (Glonass), a Beidou navigation satellite system (Beidou), Galileo, the European global satellite-based navigation system, according to GNSS using areas, bandwidths, etc. In the present disclosure, "GPS" and "GNSS" may be used interchangeably. Wired communication may include a universal serial bus (USB), a high definition multimedia interface (HDMI), a recommended standard 232 (RS-232), and a plain old telephone service (POTS). The network 162 may include at least one of the following: a telecommunications network, e.g., a computer network (e.g., a local area network (LAN) or a wide area network (WAN)), the Internet, and a telephone network.

The first and second external electronic devices 102 and 104 are each identical to or different from the electronic device 101, in terms of type. According to an embodiment of the present disclosure, the server 106 is capable of including a group of one or more servers. Part or all of the operations executed on the electronic device 101 may be executed on another electronic device or a plurality of other electronic devices (e.g., electronic devices 102 and 104 or a server 106). If an electronic device must perform a function or service automatically or according to a request, it may not perform the function or service, but is capable of requesting at least part of a function related to the function or service to be performed by the electronic devices 102 and 104 or the server 106. The electronic devices 102 and 104 and the server 106 are capable of executing a requested function or additional functions, and transmitting the result to the electronic device 101. The electronic device 101 processes a received result, or further proceeds with additional processes, to provide the requested function or service. To this end, the electronic device 101 may employ cloud computing, distributed computing, or client-server computing technology.

Figure 2:
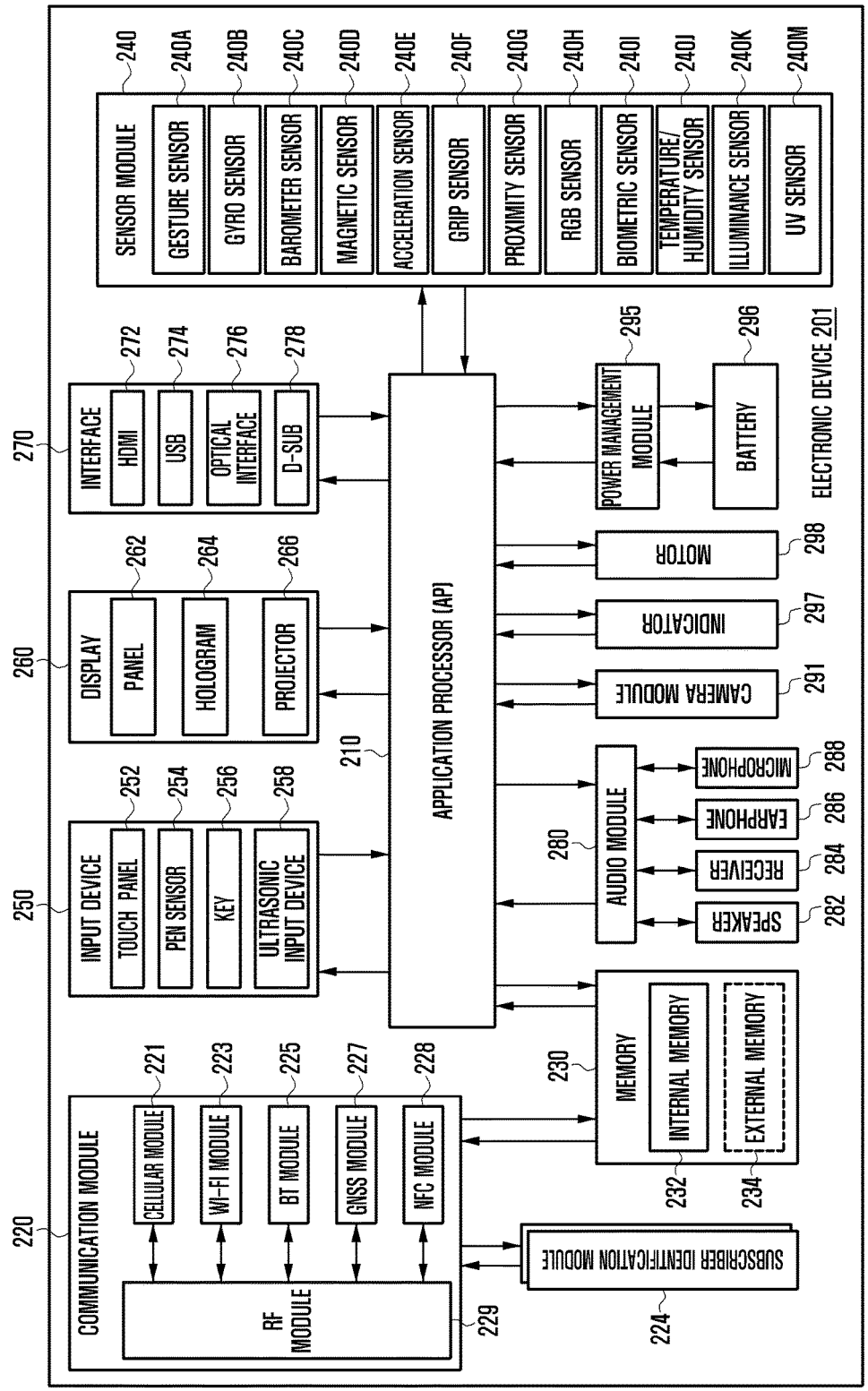
FIG. 2 is a block diagram illustrating of an electronic device according to an embodiment of the present disclosure.

FIG. 2 is a block diagram of an electronic device 201 according to an embodiment of the present disclosure. For example, the electronic device 201 is capable of including all or part of the components in the electronic device 101 shown in FIG. 1. The electronic device 201 is capable of including one or more processors 210 (e.g., APs), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an OS or an application program to control a plurality of hardware or software components connected to the processor 210, processing various data, and performing operations. The processor 210 may be implemented as, for example, a system on chip (SoC). According to an embodiment of the present disclosure, the processor 210 may further include a graphics processing unit (GPU) and/or an image signal processor. The processor 210 may also include at least part of the components shown in FIG. 2, e.g., a cellular module 221. The processor 210 is capable of loading commands or data received from at least one of the other components (e.g., a non-volatile memory) on a volatile memory, and processing the loaded commands or data. The processor 210 is capable of storing various data in a non-volatile memory.

The communication module 220 may include the same or similar configurations as the communication interface 170 shown in FIG. 1. For example, the communication module 170 is capable of including a cellular module 221, a Wi-Fi module 223, a Bluetooth (BT) module 225, a GNSS module 227 (e.g., a GPS module, a Glonass module, a Beidou module or a Galileo module), an NFC module 228, and a radio frequency (RF) module 229.

The cellular module 221 is capable of providing a voice call, a video call, a short message service (SMS), an Internet service, etc., through a communication network, for example. According to an embodiment of the present disclosure, the cellular module 221 is capable of identifying and authenticating an electronic device 201 in a communication network by using a subscriber identification module (SIM) 224 (e.g., a SIM card). The cellular module 221 is capable of performing at least part of the functions provided by the processor 210. The cellular module 221 is also capable of including a CP.

Each of the Wi-Fi module 223, the BT module 225, the GNSS module 227, and the NFC module 228 is capable of including a processor for processing data transmitted or received through the corresponding module. According to an embodiment of the present disclosure, at least part of the cellular module 221, the Wi-Fi module 223, the BT module 225, the GNSS module 227, and the NFC module 228 (e.g., two or more modules) may be included in one integrated circuit (IC) or one IC package.

The RF module 229 is capable of transmission/reception of communication signals, e.g., RF signals. The RF module 229 is capable of including a transceiver, a power amplifier module (PAM), a frequency filter, a low noise amplifier (LNA), an antenna, etc. According to an embodiment of the present disclosure, at least one of the cellular module 221, Wi-Fi module 223, BT module 225, GNSS module 227, and NFC module 228 is capable of transmission/reception of RF signals through a separate RF module.

The SIM module 224 is capable of including a card and/or an embodied SIM. The SIM module 224 is also capable of containing unique identification information, e.g., an integrated circuit card identifier (ICCID), or subscriber information, e.g., an international mobile subscriber identity (IMSI).

The memory 230 (e.g., the memory 130 shown in FIG. 1) is capable of including an internal memory 232 or an external memory 234. The internal memory 232 is capable of including at least one of the following: a volatile memory, e.g., a dynamic random access memory (RAM) (DRAM), a static RAM (SRAM), a synchronous dynamic RAM (SDRAM), etc.; and a non-volatile memory, e.g., a one-time programmable read only memory (ROM) (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.), a hard drive, a solid state drive (SSD), etc.

The external memory 234 is also capable of including a flash drive, e.g., a compact flash (CF) drive, a secure digital (SD) memory card, a micro secure digital (Micro-SD) memory card, a mini secure digital (Mini-SD) memory card, an extreme digital (xD) memory card, a multi-media card (MMC), a memory stick, etc. The external memory 234 is capable of being connected to the electronic device 201, functionally and/or physically, through various interfaces.

The sensor module 240 is capable of measuring/detecting a physical quantity or an operational state of the electronic device 201, and converting the measured or detected information into an electrical signal. The sensor module 240 includes a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) light sensor 240M. Additionally or alternatively, the sensor module 240 is capable of further including an electronic nose (E-nose) sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In an embodiment of the present disclosure, the electronic device 201 is capable of including a processor, configured as part of the processor 210 or a separate component, for controlling the sensor module 240. In this case, while the processor 210 is operating in reduced power or sleep mode, the processor is capable of controlling the sensor module 240.

The input device 250 is capable of including a touch panel 252, a (digital) pen sensor 254, a key 256, or an ultrasonic input unit 258. The touch panel 252 may be implemented with a capacitive touch system, a resistive touch system, an infrared touch system, and an ultrasonic touch system. The touch panel 252 may further include a control circuit. The touch panel 252 may also include a tactile layer to provide a tactile response to the user.

The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 is capable of including a panel 262, a hologram unit 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment of the present disclosure, the display 260 may further include a control circuit for controlling the panel 262, the hologram unit 264, or the projector 266.

The interface 270 is capable of including an HDMI 272, a USB 274, an optical interface 276, or a D-subminiature (D-sub) connector 278. The interface 270 may be included in the communication interface 170 shown in FIG. 1. Additionally or alternatively, the interface 270 is capable of including a mobile high-definition link (MHL) interface, an SD card/MMC interface, or an Infrared Data Association (IrDA) standard interface.

The audio module 280 is capable of providing bidirectional conversion between sound and an electrical signal. At least part of the components in the audio module 280 may be included in the input/output interface 150 shown in FIG. 1. The audio module 280 is capable of processing sound information input or output through a speaker 282, a receiver 284, an earphone 286, the microphone 288, etc.

The camera module 291 refers to a device capable of taking both still and moving images. According to an embodiment of the present disclosure, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment of the present disclosure, the power management module 295 is capable of including a power management integrated circuit (PMIC), a charger IC, or a battery gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a certain status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. The electronic device 201 is capable of further including a processing unit (e.g., a GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 3:
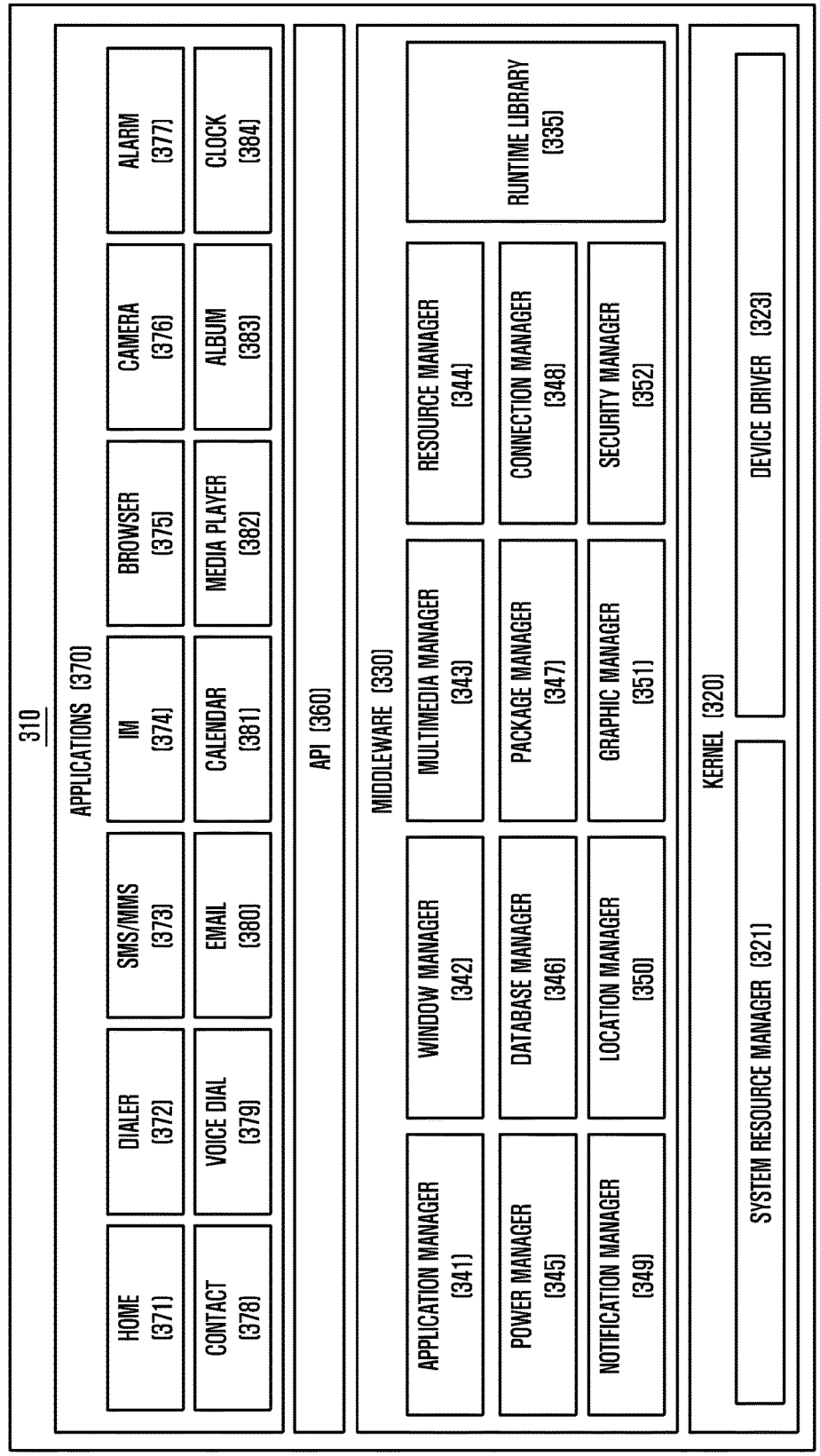
FIG. 3 is a block diagram of a program module according to an embodiment of the present disclosure.

FIG. 3 is a block diagram of a programming module according to an embodiment of the present disclosure. The program module 310 (e.g., the program module 140 shown in FIG. 1) is capable of including an OS for controlling resources related to the electronic device (e.g., electronic device 101) and/or various applications (e.g., the application programs 147 shown in FIG. 1) running on the OS. The OS may be Android®, iOS®, Windows®, Symbian®, Tizen®, Bada™, etc.

The program module 310 is capable of including a kernel 320, middleware 330, an application programming interface (API) 360 and/or applications 370. At least part of the program module 310 may be preloaded on the electronic device 102 or 104 or downloaded from the server 106.

The kernel 320 may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a Wi-Fi driver, and an audio driver. Further, according to an embodiment of the present disclosure, the device driver 323 may include an inter-process communication (IPC) driver.

The middleware 330 may provide a function required in common by the applications 370. Further, the middleware 330 may provide a function through the API 360 to allow the applications 370 to efficiently use limited system resources within the electronic device. According to an embodiment of the present disclosure, the middleware 330 (for example, the middleware 143 in FIG. 1) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment of the present disclosure, the runtime library 335 executes input and output, management of a memory, a function associated with an arithmetic function and the like.

The application manager 341 may manage, for example, a life cycle of at least one of the applications 370. The window manager 342 may manage graphical user interface (GUI) resources used on the screen. The multimedia manager 343 may detect a format required for reproducing various media files and perform an encoding or a decoding of a media file by using a codec suitable for the corresponding format. The resource manager 344 manages resources such as source code, a memory, or a storage space of at least one of the applications 370.

The power manager 345 may operate together with a basic input/output system (BIOS) to manage a battery or power and provide power information required for the operation. The database manager 346 may manage the generation, the search, and the change of a database to be used by at least one of the applications 370. The package manager 347 may manage an installation or an update of an application distributed in a form of a package file.

The connection manager 348 may manage, for example, a wireless connection such as Wi-Fi or Bluetooth. The notification manager 349 may display or notify a user of an event such as an arrival of a message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for system security or user authentication. According to an embodiment of the present disclosure, if the electronic device 101 has a call function, the middleware 330 may further include a telephony manager for managing a voice call function of the electronic device or a video call function.

The middleware 330 is capable of including modules configuring various combinations of functions of the above-described components. The middleware 330 is capable of providing modules specialized according to types of operation systems to provide distinct functions. The middleware 330 may be adaptively configured in such a way as to remove part of the existing components or to include new components.

The API 360 may be a set of API programming functions, and may be provided with a different configuration according to an OS. For example, in Android® or iOS®, a single API set may be provided for each platform. In Tizen®, two or more API sets may be provided.

The applications 370 may include one or more applications for performing various functions, e.g., a home application 371, a dialer application 372, an SMS/MMS application 373, an instant messaging (IM) application 374, a browser application 375, a camera application 376, an alarm application 377, a contact application 378, a voice dial application 379, an email application 380, a calendar application 381, a media player application 382, an album application 383, a clock application 384, a health care application (e.g., an application for measuring an amount of exercise, a blood sugar level, etc.), and environmental information application (e.g., an application for providing atmospheric pressure, humidity, temperature, etc.).

According to an embodiment of the present disclosure, the applications 370 may include an information exchange application between an electronic device 101 and the electronic devices 102 and 104. The information exchange application is capable of including a notification relay application for relaying certain information to external devices or a device management application for managing external devices.

For example, the notification relay application is capable of including a function for relaying notification information, created in other applications of the electronic device (e.g., an SMS/MMS application 373, an email application 380, a health care application, an environment information application, etc.) to the electronic devices 102 and 104. In addition, the notification relay application is capable of receiving notification information from external devices to provide the received information to a user.

The device management application is capable of managing (e.g., installing, removing or updating) at least one function of the electronic devices 102 and 104 communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment of the present disclosure, the applications 370 are capable of including application (e.g., a health care application of a mobile medical device, etc.) specified attributes of the electronic devices 102 and 104. The applications 370 are capable of including applications received from the server 106, and electronic devices 102 and 104. The applications 370 are capable of including a preloaded application or third party applications that can be downloaded from a server. It should be understood that the components of the program module 310 may be referred to by different names according to the types of operating systems.

According to an embodiment of the present disclosure, at least part of the program module 310 may be implemented with software, firmware, hardware, or any combination of two or more of them. At least part of the program module 310 may be implemented (e.g., executed) by a processor. At least part of the programing module 310 may include modules, programs, routines, sets of instructions or processes, etc., in order to perform one or more functions.

Figure 4:
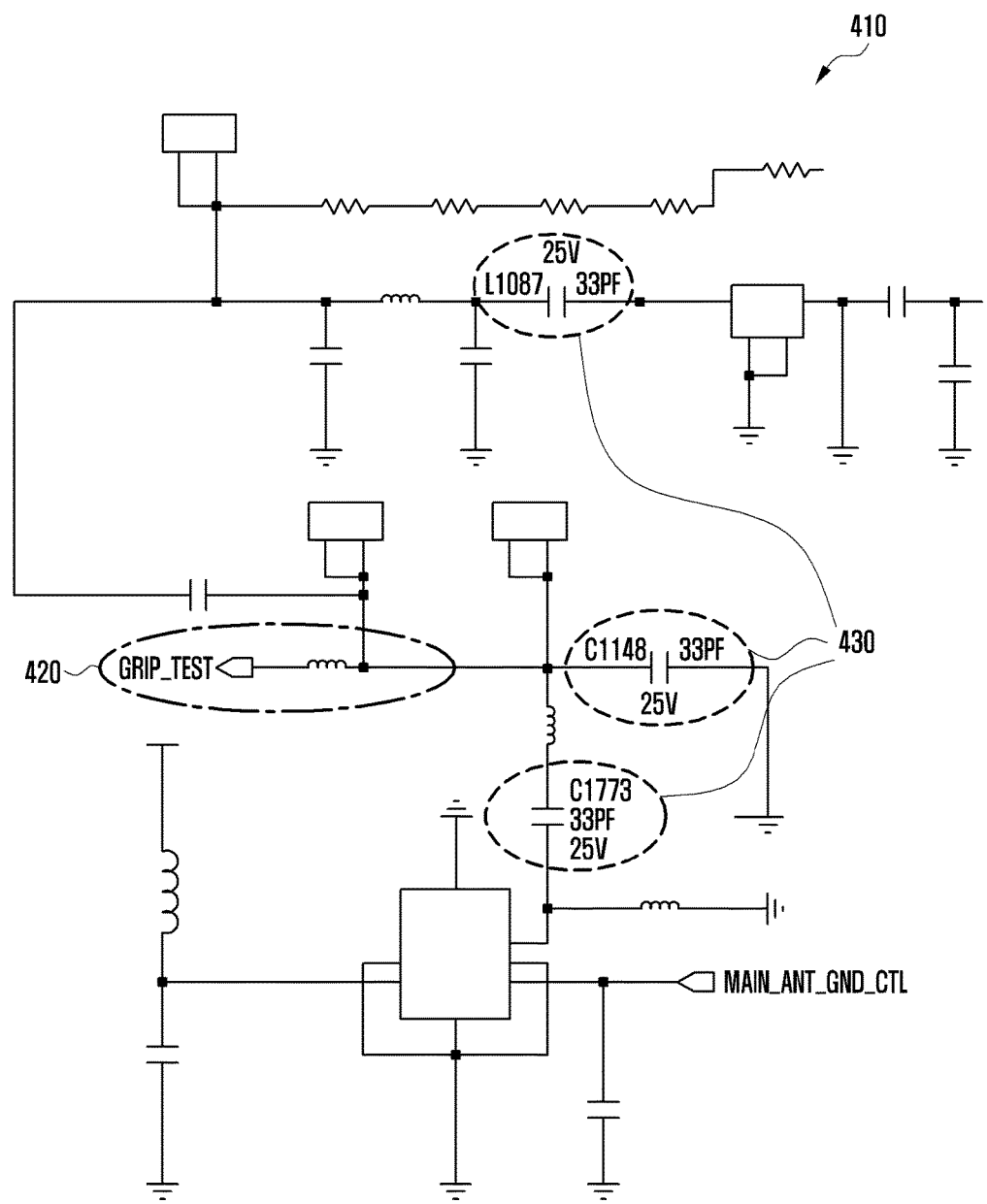
FIG. 4 is a circuit diagram of a grip sensor of an electronic device.

FIG. 4 is a circuit diagram of a grip sensor of an electronic device.

Referring to FIG. 4, the electronic device includes a grip sensor 410. The grip sensor 410 may include a plurality of devices such as capacitors, resisters, and inductors. The grip sensor 410 includes a grip-test line 420 and capacitors 430, i.e., L1087, C1148, and C1773 (e.g., shunt capacitors or caps), connected to the grip test line 420 via signal lines. Typically, the grip-test line 420 may include an inductor with an inductance of 100 nH to 150 nH. The electronic device may detect a change in the inductance of the capacitors 430 to determine whether the electronic device is in the state of being gripped based on the amount of change in the inductance. The electronic device may include a plurality of devices for implementing the grip sensor.

In addition, the capacitors forming the grip sensor of the electronic device may contribute to antenna performance degradation. As the number of capacitors increases, the antenna performance degradation of the electronic device is likely to become worse. Furthermore, the capacitors required for forming the grip sensor may increase the total manufacturing cost of the electronic device.

An embodiment of the present disclosure is directed to a method of detecting a user's grip based on an antenna reflection coefficient without using a grip sensor. This indicates that the grip recognition method is capable of reducing the total manufacturing cost of the electronic device and saving internal space of the electronic device by removing the necessity for capacitors required for forming a grip sensor.

Figure 5:
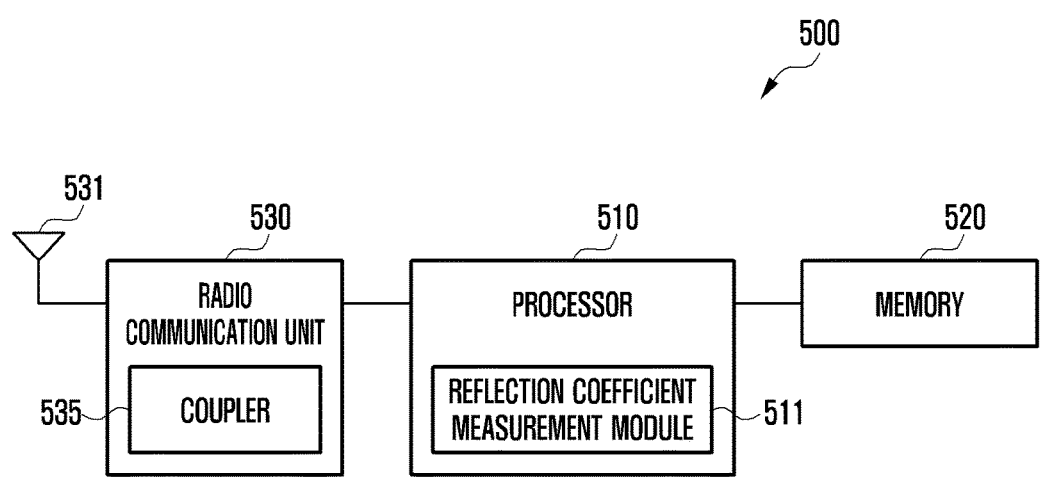
FIG. 5 is a block diagram of an electronic device configured to recognize a user's grip based on an antenna reflection coefficient-based grip recognition method according to an embodiment of the present disclosure.

FIG. 5 is a block diagram of an electronic device 500 configured to recognize a user's grip based on an antenna reflection coefficient-based grip recognition method according to an embodiment of the present disclosure.

Referring to FIG. 5, the electronic device 500 may include a processor 510, a memory 520, a radio communication unit 530, and an antenna 531. The processor 510 may be electrically connected to the memory 520 and the radio communication unit 530 for mutual communication therebetween. In particular, the processor 510 may generate signals for controlling the memory 520 and the radio communication unit 530.

According to an embodiment of the present disclosure, the processor 510 may include a reflection coefficient measurement module 511. The reflection coefficient measurement module 511 may measure a reflection coefficient of the antenna 531. For example, the processor 510 may detect transmission (Tx) signals being transmitted and reception (Rx) signals being received through the antenna 531. That is, the processor 510 may measure values (e.g., voltage values) of Tx and Rx signals. The reflection coefficient measurement module 511 may calculate the reflection coefficient of the antenna 531 based on the Tx and Rx signals. It may be possible to determine a forward coupling signal based on the detected Tx signal and a reverse coupling signal based on the detected Rx signal. The reflection coefficient measurement module 511 may calculate the reflection coefficient (e.g., Fin and gamma coefficient) of the antenna 531 based on the forward and reverse coupling signals. The reflection coefficient measurement module 511 may determine a signal magnitude and phase corresponding to the calculated reflection coefficient.

According to an embodiment of the present disclosure, the memory 520 may store a lookup table (e.g., a non-volatile look-up-table (NV LUT)) and a gamma chart for determining a user's grip on the electronic device. Here, the lookup table and the gamma chart may be preconfigured by a developer for use in determining whether an electronic device is being gripped based on a signal magnitude and a phase of the antenna 531. The memory 520 may also store an equation for calculating the reflection coefficient.

According to an embodiment of the present disclosure, the electronic device 500 may communicate signals with another electronic device by means of the radio communication unit 530. The radio communication unit 530 takes charge of communicating signals with another electronic device. The radio communication unit 530 may transmit and receive signals through the antenna 531. The radio communication unit 530 may include radio communication circuitry including a coupler 535 for measuring the reflection coefficient of the antenna 531. Here, the coupler 535 may be a bi-directional coupler. The electronic device 500 may detect a forward coupling signal being transmitted and a reverse coupling signal being received through the antenna 531 by means of the coupler 535. The electronic device 500 may be controlled such that the coupler 535 detects the forward and reverse coupling signals and the reflection coefficient measurement module 511 calculates the reflection coefficient of the antenna 531 based on the forward and reverse coupling signals.

According to an embodiment of the present disclosure, the electronic device may recognize a user's grip based on the reflection coefficient without using a grip sensor. In the case of using a diversity antenna, the electronic device may recognize an approach of an object based on the reflection coefficient of the diversity antenna without using a proximity sensor. The electronic device may recognize a user's grip thereon and an approach of an object thereto based on the antenna reflection coefficient and the diversity antenna reflection coefficient. The electronic device may recognize its state as being gripped, a state of being placed in a pocket (e.g., a jacket pocket and a pants pocket), and a state of a call in progress. The electronic device may recognize whether it is being gripped around its top part or its bottom part. The electronic device may use a proximity sensor arranged at its top part to recognize a user's grip around the top part.

According to an embodiment of the present disclosure, an electronic device includes an antenna, a radio communication unit having a coupler, a memory, and a processor which is electrically connected to the radio communication unit and the memory, wherein the memory stores instructions, executable by the processor, for detecting a first signal being transmitted and a second signal being received through the antenna using the coupler, calculating a reflection coefficient of the antenna based on the first and second signals, determining a signal magnitude and phase corresponding to the reflection coefficient, and determining whether the electronic device is in a state of being gripped based on the signal magnitude and phase.

According to an embodiment of the present disclosure, the electronic device further includes a transceiver which generates and transmits the first signal, wherein the processor detects, if the first signal is transmitted to the antenna via the coupler, the first signal by means of the coupler.

According to an embodiment of the present disclosure, the processor detects, if the second signal received by the antenna is transmitted to the transceiver via the coupler, the second signal by means of the coupler.

According to an embodiment of the present disclosure, the coupler is a bi-directional coupler, and the processor detects the first and second signal separately by means of the bi-directional coupler.

According to an embodiment of the present disclosure, the memory stores a predetermined equation, and the processor calculates the reflection coefficient of the antenna by substituting values of the first and second signals into the equation.

According to an embodiment of the present disclosure, the memory stores a lookup table and a gamma chart for determining the signal magnitude and phase corresponding to the reflection coefficient.

According to an embodiment of the present disclosure, the electronic device further includes a diversity antenna, wherein the processor detects, if the radio communication unit is switched from the antenna to the diversity antenna, the first and second signals transmitted to and from the diversity antenna and calculates the reflection coefficient of the diversity antenna based on the first and second signals.

According to an embodiment of the present disclosure, the processor determines the signal magnitude and phase corresponding to the reflection coefficient of the diversity antenna and determines whether an object is approaching the electronic device based on the signal magnitude and phase.

According to an embodiment of the present disclosure, the processor determines a state of the electronic device based on the reflection coefficients of the antenna and the diversity antenna.

According to an embodiment of the present disclosure, the processor enables, if the electronic device is being gripped, an electromagnetic function for reducing electromagnetic wave radiation.

Figure 6:
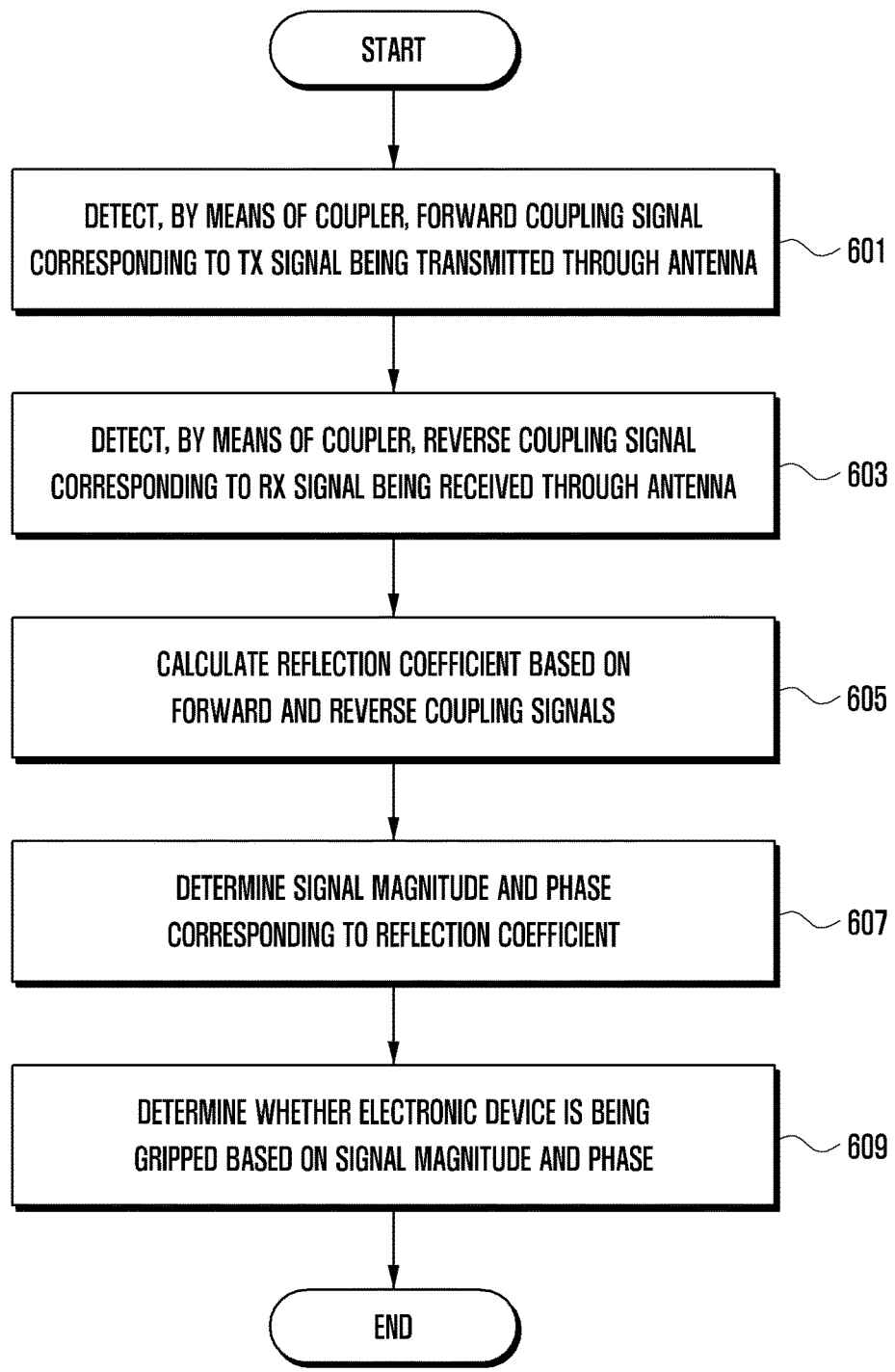
FIG. 6 is a flowchart of an antenna reflection coefficient-based grip recognition method of an electronic device according to an embodiment of the present disclosure.

FIG. 6 is a flowchart of an antenna reflection coefficient-based grip recognition method of an electronic device according to an embodiment of the present disclosure.

Referring to FIG. 6, at step 601 the processor 510 of the electronic device 500 may detect, by means of the coupler 535, a forward coupling signal corresponding to a Tx signal transmitted through the antenna 531. For example, the Tx signal may be a signal generated by a transceiver of the electronic device 500, wherein the signal passes through plural components (e.g., a power amplifier (PA)) and is then transmitted through the antenna 531. The coupler 535 may be a bi-directional coupler, and the processor 510 may detect a forward coupling signal corresponding to the Tx signal by means of the coupler 535. That is, the processor 510 may measure a signal value (e.g., a voltage value) of the forward coupling signal corresponding to the Tx signal.

At step 603, the processor 510 may detect, by means of the coupler 535, a reverse coupling signal corresponding to an Rx signal received through the antenna 531. According to an embodiment of the present disclosure, the electronic device 500 may detect the forward coupling signal corresponding to the Tx signal and the reverse coupling signal corresponding to the Rx signal by means of a bi-directional coupler. The processor 510 may measure a signal value (e.g., a voltage value) of the reverse coupling signal corresponding to the Rx signal.

The processor 510 may calculate a reflection coefficient based on the forward and reverse coupling signals at step 605. The reflection coefficient, along with a reflection coefficient equation, is described below in greater detail with reference to FIG. 7C. The reflection coefficient equation may be determined by a developer or stored in the memory 520.

The processor 510 may determine the signal magnitude and phase corresponding to the calculated reflection coefficient at step 607. According to an embodiment of the present disclosure, the processor 510 may determine the signal magnitude and phase corresponding to the reflection coefficient by means of the reflection coefficient measurement module 511.

At step 609, the processor 510 may determine whether the electronic device is being gripped based on the signal magnitude and phase. According to an embodiment of the present disclosure, a lookup table (e.g., an NV LUT) and a gamma chart for determining a user's grip on the electronic device may be stored in the memory 520. The lookup table and the gamma chart may be preconfigured by a developer for use in determining whether the electronic device is being gripped based on the signal magnitude and phase of the antenna 531. The processor 510 may compare the determined signal magnitude and phase to the values recorded in the lookup table to determine whether the electronic device is being gripped.

Although the above description is directed to the case where the user's grip on the electronic device is recognized based on the reflection coefficient of the antenna, the present disclosure is not limited thereto.

According to an embodiment of the present disclosure, in the case of switching from a main antenna to a diversity antenna, the electronic device may recognize an approach of an object without assistance of a proximity sensor. It may be possible to calculate the reflection coefficient of the diversity antenna for use in recognizing the approach of a user. If the antenna reflection coefficient lookup tables and gamma charts for the main antenna and the diversity antenna are stored in the memory, the electronic device may distinguish among more finely categorized states of the electronic device (e.g., being gripped, being placed in a pocket, and an approach of a user).

According to an embodiment of the present disclosure, it may be possible to implement the grip and proximity recognition function based on an antenna reflection coefficient and diversity antenna reflection coefficient without assistance of a grip sensor and a proximity sensor. This indicates that the grip recognition method is capable of reducing the total manufacturing cost of the electronic device by removing the necessity for the components (e.g., capacitors) required for forming a grip sensor and a proximity sensor. As a result of removing the necessity for the components of a grip sensor and a proximity sensor, it may also be possible to save internal space of the electronic device. That is, the reflection coefficient-based grip recognition method is capable of reducing the total manufacturing cost of the electronic device and improving antenna performance (e.g., 0.1-0.5 dB) by the removal of the components of the grip sensor and the proximity sensor. In addition, the reflection coefficient-based grip recognition method is capable of saving the mounting space of the removed components.

Figure 7A:
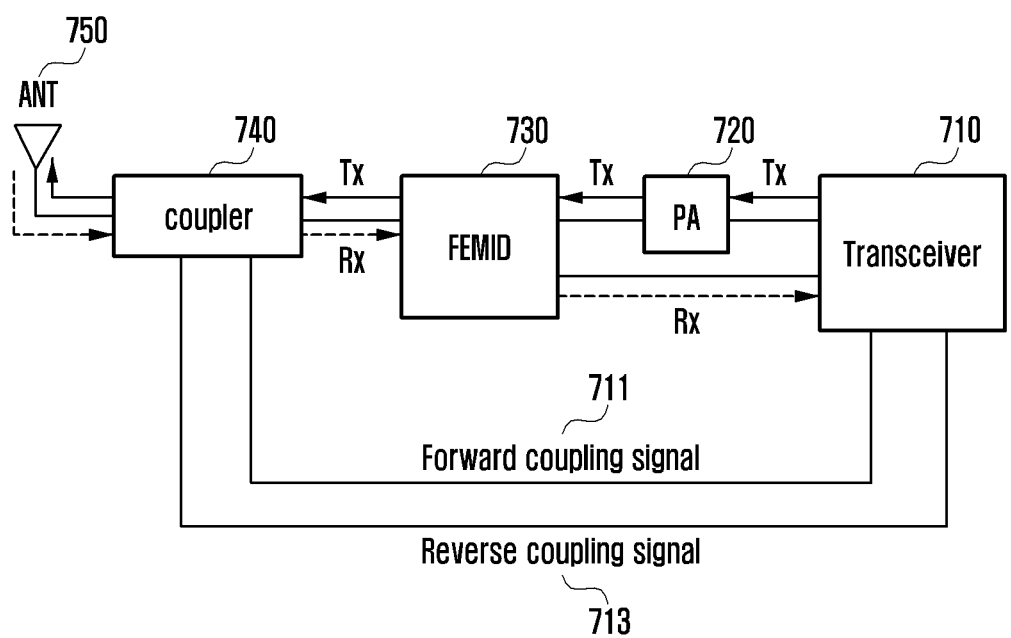
FIGS. 7A and 7B are circuit diagrams of antenna reflection coefficient circuitry with a bi-directional couplers according to various embodiments of the present disclosure.
Figure 7B:
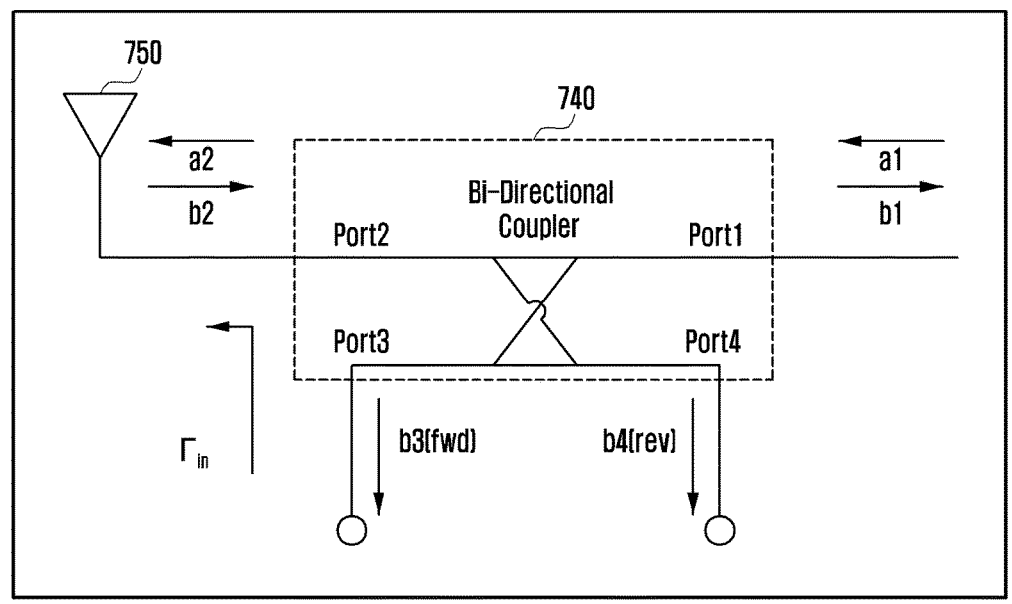

FIGS. 7A and 7B are circuit diagrams of antenna reflection coefficient circuitry with a bi-directional coupler according to an embodiment of the present disclosure.

Referring to FIG. 7A, the electronic device may receive and transmit signals by means of a transceiver 710. A Tx signal generated by the transceiver 710 may be amplified by a PA 720. The Tx signal is transferred to a coupler 740 via a front-end module with an integrated duplexer (FEMID) 730. The FEMID 730 is a component for separating transmission and reception of high frequency signals. The Tx signal passed to the coupler 740 is transmitted to another electronic device through an antenna 750. Here, the coupler 740 is a bi-directional coupler and, according to an embodiment of the present disclosure, the electronic device may detect the Tx signal separately by means of the coupler 740. That is, the Tx signal detected by the coupler 740 may be a forward coupling signal 711.

According to an embodiment of the present disclosure, the electronic device may receive an Rx signal by means of the antenna 750. The Rx signal may be sent to the FEMID 730 via the coupler 740. The FEMID 730 may transfer the Rx signal to the transceiver 710. The electronic device may detect the Rx signal separately by means of the coupler 740. That is, the Rx signal detected by the coupler 740 may be a reverse coupling signal 713.

According to an embodiment of the present disclosure, the electronic device may detect the forward coupling signal 711 corresponding to the Tx signal and the reverse coupling signal 713 corresponding to the Rx signal by means of the coupler (e.g., bi-directional coupler). It may be possible to calculate the reflection coefficient of the antenna 750 based on the detected forward coupling signal 711 and the detected reverse coupling signal 713. It may also be possible to determine whether the electronic device is being gripped based on the calculated reflection coefficient. That is, the electronic device may implement a grip sensing function based on the reflection coefficient of the antenna 750 without a grip sensor.

According to an embodiment of the present disclosure, the electronic device may switch from the antenna 750 to a diversity antenna. The electronic device may detect forward and reverse coupling signals of the diversity antenna by means of the coupler. The electronic device may calculate the reflection coefficient of the diversity antenna based on the forward and reverse coupling signals. It may be possible to recognize a user's approach based on the reflection coefficient of the diversity antenna. That is, the electronic device may implement a proximity sensing function based on the reflection coefficient of the diversity antenna without a proximity sensor.

FIG. 7B is a block diagram of the coupler 740 shown in FIG. 7A according to an embodiment of the present disclosure.

Referring to FIG. 7B, a description of the configuration of the coupler 740 is provided below. The coupler 740 is a bi-directional coupler, which may detect a Tx signal passing therethrough and transmitted to the outside and an Rx signal received by the antenna 750.

The Tx signal a1 generated by the transceiver 710 may pass through the coupler 740 and the Tx signal a2 passed through the coupler 740 may be transmitted through the antenna 750. The Tx signal a1 is input to port1 and then output from port2 as a2, which may be transmitted through the antenna 750. The electronic device may be configured such that the coupler 740 sends the Tx signal a1 to port3 to detect the forward coupling signal b3(fwd) (hereinafter b3) passed through port3.

An Rx signal b2 received by the antenna 750 may pass through the coupler 740, and the Rx signal b1 passed therethrough may be fed on to the next function block. The Rx signal b2 may be input to port2 and then output from port1 to be fed on to the next function block. The electronic device may be configured such that the coupler 740 sends the Rx signal b2 to port4 to detect the reverse coupling signal b4(rev) (hereinafter b4) passed through port4.

According to an embodiment of the present disclosure, the electronic device may detect the forward coupling signal corresponding to the Tx signal and the reverse coupling signal corresponding to the Rx signal separately by means of the coupler (bi-directional coupler). The electronic device may determine whether it is being gripped based on the forward and reverse coupling signals.

FIG. 7C is an illustration of a reflection coefficient equation according to an embodiment of the present disclosure.

Referring to FIG. 7C, the reflection coefficient ($\Gamma_{in}$) may be calculated based on the forward and reverse coupling signals b3 and b4 using Equation (1) as follows:

$$\Gamma_{in} = \frac{s_{31}\frac{b_4}{b_3} - s_{41}}{(s_{42}s_{21} - s_{41}s_{22}) - (s_{32}s_{21} - s_{31}s_{22})\frac{b_4}{b_3}} \quad (1)$$

In Equation (1) above, the s values ($s_{21}$, $s_{22}$, $s_{31}$, $s_{32}$, $s_{41}$, $s_{42}$) may be certain values (constants) predefined by a developer. As shown in Equation (1) above, the reflection coefficient ($\Gamma_{in}$) is calculated by dividing the reverse coupling signal b4 by the forward coupling signal b3. The above equation may be predetermined by a developer and stored in a memory.

FIG. 8A is a diagram of an NV LUT 800 mapping reflection coefficient values to signal magnitude and phase values according to an embodiment of the present disclosure. FIG. 8A shows the NV LUT 800 mapping reflection coefficient values to signal magnitude and phase values. The NV LUT 800 may be preconfigured by a developer and stored in a memory. The NV LUT 800 may be configured based on antenna reflection coefficients.

Referring to FIG. 8A, if the signal magnitude (mag) and phase values mapped to the antenna reflection coefficient are 0.0 and 0.0, respectively, as denoted by reference number 801, which indicates that the electronic device is not being gripped. The signal magnitude and phase values listed in the NV LUT 800 may be preset to indicate diverse states of the electronic device. For example, the signal magnitude of 0.80 and the phase of 315.0 may be preset to indicate that the electronic device is held up to an ear of a user.

According to an embodiment of the present disclosure, a processor may determine the signal magnitude and phase values corresponding to the antenna reflection coefficient. The electronic device may determine whether it is being gripped based on an antenna-specific lookup table. If it is determined that the electronic device is being gripped, the electronic device may calculate the antenna reflection coefficient in the state of being gripped and store the signal magnitude and phase values corresponding to the calculated antenna reflection coefficient in the lookup table. It may be possible to determine whether the electronic device is being gripped based on an antenna-specific lookup table.

According to an embodiment of the present disclosure, if the electronic device switches from the antenna to a diversity antenna, a processor may determine the signal magnitude and phase values corresponding to the diversity antenna. It may be possible to monitor to detect a user's approach to the electronic device based on a lookup table for the diversity antenna. The electronic device may calculate the diversity antenna reflection coefficient in a situation where the user has approached close to the electronic device and store the signal magnitude and phase values corresponding to the calculated diversity antenna reflection coefficient in the lookup table for the diversity antenna. It may be possible to determine a user's approach to the electronic device based on the lookup table for the diversity antenna.

According to an embodiment of the present disclosure, if there are lookup tables for the respective main and diversity antennas in the memory, it may be possible to distinguish among more finely categorized states of the electronic device (e.g., state of being gripped and state of being placed in a pocket).

Figure 8B:
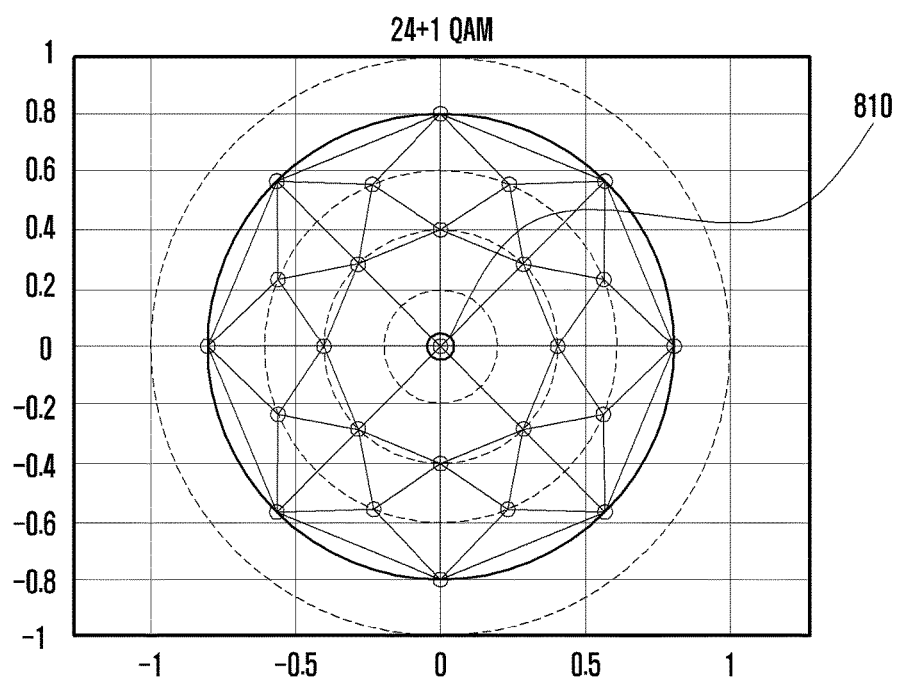
FIGS. 8B and 8C are diagrams of gamma charts for signal magnitudes and phases corresponding to reflection coefficient values according to various embodiments of the present disclosure.
Figure 8C:
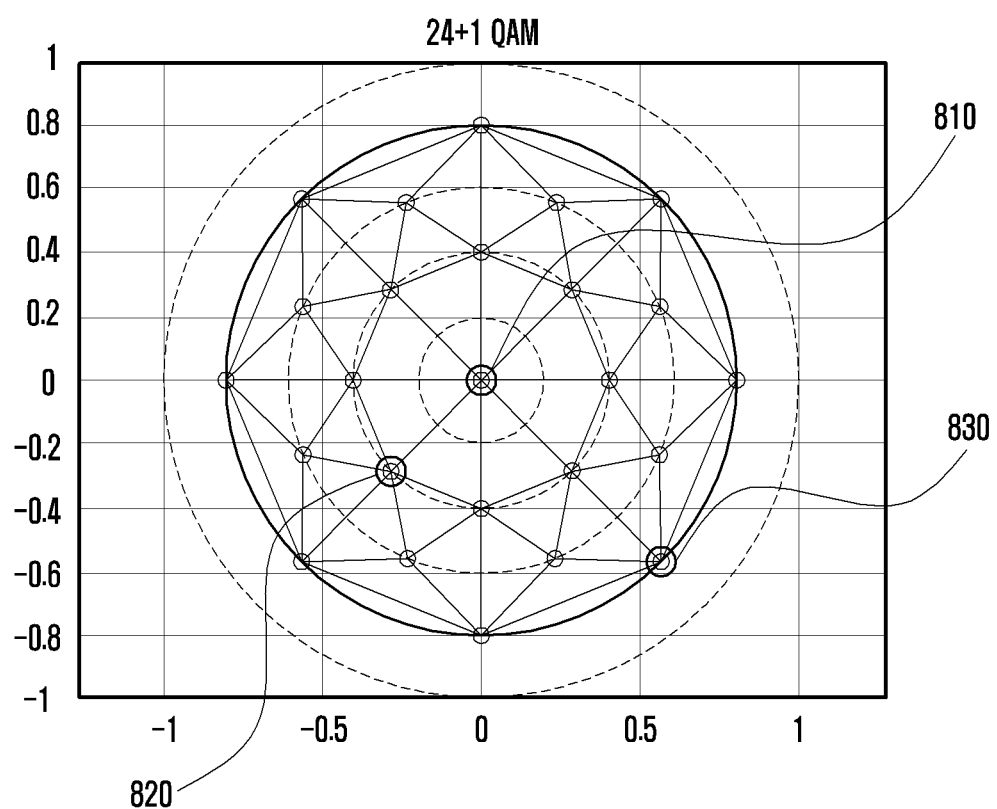

FIGS. 8B and 8C are diagrams of gamma charts for signal magnitudes and phases corresponding to reflection coefficient values according to an embodiment of the present disclosure. The gamma charts may be preconfigured by a developer and stored in a memory. Each gamma chart is comprised of a plurality of points mapped to the signal magnitudes and phases corresponding to the reflection coefficient values. Each point may correspond to a state of the electronic device. For example, at least one of the points may correspond to a state of being gripped. At least one of the points may correspond to a state of the electronic device being placed in a pocket of a pair of pants.

Referring to FIG. 8B, in a case where the load impedance of the antenna is matched to 50 ohm, the signal magnitude and phase corresponding to the antenna reflection coefficient may be 0.0 and 0 degrees)(0°, respectively. If the signal magnitude is 0.0, this indicates that the diameter of the circle depicted in the gamma chart is 0. If the signal phase is 0 degrees, this indicates that the position of the point corresponding to the antenna reflection coefficient is 0 degrees. Accordingly, the origin 810 of the gamma chart may be expressed as (0, 0) if the load impedance of the antenna is matched to 50 ohm.

Referring to FIG. 8C, reference number 820 denotes a first point to which the signal magnitude of 0.4 and the signal phase of 225 degree corresponding to the antenna reflection coefficient is mapped. Reference number 830 denotes a second point to which the signal magnitude of 0.8 and the signal phase of 315 degree corresponding to the antenna reflection coefficient is mapped. For example, the first point 820 may indicate a situation where a user holds the electronic device while watching its screen, and the second point 830 may indicate a situation where the electronic device is placed in a hip pocket of the user's pants. According to an embodiment of the present disclosure, it may be possible to recognize the state of the electronic device based on the signal magnitude and phase values corresponding to the antenna reflection coefficient values.

According to an embodiment of the present disclosure, if the electronic device may have a main antenna and a diversity antenna switchable therebetween, it may be possible to configure a lookup table for the diversity antenna and store it in the memory.

According to an embodiment of the present disclosure, it may be possible to use different lookup tables for the main and diversity antennas to distinguish among more finely categorized states of the electronic device.

Figure 9A:
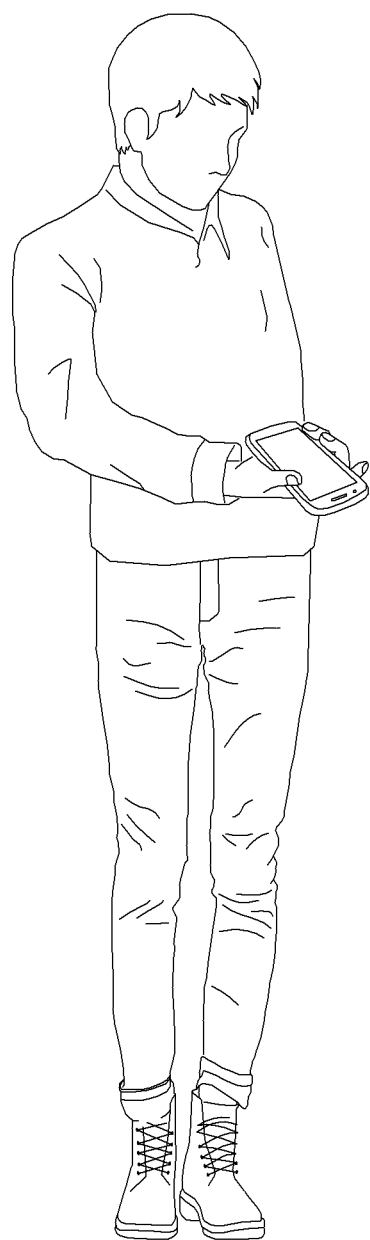
FIGS. 9A and 9B are illustrations of situations where an electronic device is gripped by a user according to various embodiments of the present disclosure.
Figure 9B:
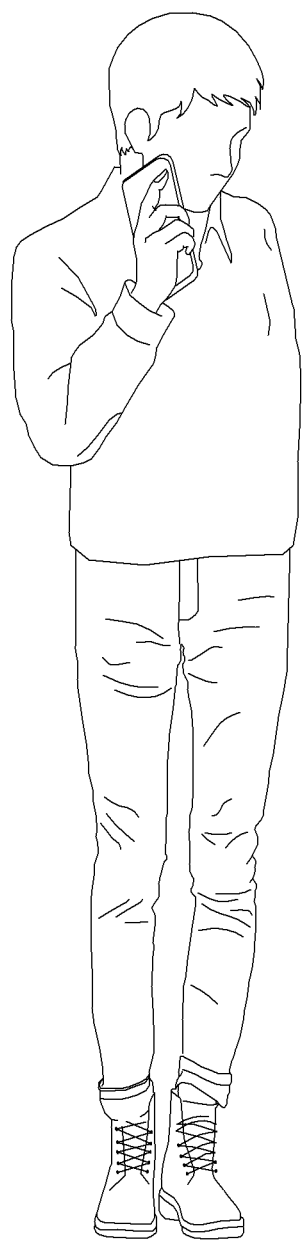

FIGS. 9A and 9B are illustrations of situations where an electronic device is gripped by a user according to various embodiments of the present disclosure.

Referring to FIGS. 9A and 9B, FIG. 9A shows a situation where the user grips the electronic device while watching the screen of the electronic device. FIG. 9B shows a situation where the user holds the electronic device up to the ear for a conversation.

According to an embodiment of the present disclosure, it may be possible to measure the antenna reflection coefficients in the situations as depicted in FIGS. 9A and 9B and generate an NV LUT with the signal magnitudes and phase values corresponding to the measured antenna reflection coefficient values. The NV LUT may be stored in the memory of the electronic device. The electronic device may calculate a reflection coefficient of its antenna and compare the signal magnitude and phase values corresponding to the calculated reflection coefficient with the values given in the NV LUT. The electronic device may recognize its state based on the comparison result.

According to an embodiment of the present disclosure, a grip recognition method of an electronic device includes detecting a first signal being transmitted and a second signal being received through an antenna using a coupler, calculating a reflection coefficient of the antenna based on the first and second signals, determining a signal magnitude and phase corresponding to the reflection coefficient, and determining whether the electronic device is in a state of being gripped based on the signal magnitude and phase.

According to an embodiment of the present disclosure, detecting the first signal includes generating, at a transceiver of the electronic device, the first signal and detecting, if the first signal is being transmitted to the antenna via the coupler, the first signal by means of the coupler.

According to an embodiment of the present disclosure, detecting the second signal includes receiving the second signal through the antenna, and detecting, if the second signal is being transmitted to a transceiver of the electronic device via the coupler, the second signal by means of the coupler.

According to an embodiment of the present disclosure, the coupler is a bi-directional coupler, which detects the first and second signals separately.

According to an embodiment of the present disclosure, calculating the reflection coefficient includes calculating the reflection coefficient based on the first and second signals using an equation stored in a memory.

According to an embodiment of the present disclosure, determining the signal magnitude and phase corresponding to the reflection coefficient includes retrieving the signal magnitude and phase from a lookup table and a gamma chart stored in a memory for use in determining the signal magnitude and phase.

According to an embodiment of the present disclosure, the grip recognition method further includes switching from the antenna to a diversity antenna, detecting, if the coupler is switched from the antenna to the diversity antenna, the first signal being transmitted to the diversity antenna, detecting the second signal being transmitted from the diversity antenna, and calculating the reflection coefficient of the diversity antenna based on the first and second signals.

According to an embodiment of the present disclosure, the grip recognition method further includes determining the signal magnitude and phase corresponding to the reflection coefficient and determining whether an object is approaching the electronic device based on the signal magnitude and phase.

According to an embodiment of the present disclosure, the grip recognition method further includes determining a state of the electronic device based on the reflection coefficients of the antenna and the diversity antenna.

According to an embodiment of the present disclosure, the grip recognition method further includes enabling, if the electronic device is being gripped, an electromagnetic function for reducing electromagnetic wave radiation.

As described above, the electronic device and method thereof for grip recognition according to the present disclosure is advantageous in terms of recognizing a user's grip on the electronic device based on the antenna reflection coefficient without using a grip sensor.

In addition, the electronic device and method thereof for grip recognition according to the present disclosure is advantageous in terms of simplifying the configuration of the electronic device by making it possible to recognize a user's grip on the electronic device based on the antenna reflection coefficient without a large number of capacitors necessitated for forming a grip sensor.

Furthermore, the electronic device and method thereof for grip recognition according to the present disclosure is advantageous in terms of reducing the total manufacturing cost of the electronic device by making it unnecessary to form a grip sensor necessitating a large number of capacitors.

Moreover, the electronic device and method thereof for grip recognition according to the present disclosure is advantageous in terms of saving mounting space for capacitors necessitated for forming a grip sensor.

Furthermore, the electronic device and method thereof for grip recognition according to the present disclosure is advantageous in terms of reducing antenna performance degradation caused by use of a large number of capacitors.

The term "module" used in the present disclosure may refer to a certain unit that includes one of hardware, software, firmware and any combination thereof. The term "module" may be used interchangeably with the terms "unit," "logic," "logical block," "component," and "circuit," for example. The term "module" may indicate a minimum unit, or part thereof, which performs one or more particular functions. The term "module" may indicate a device that may be formed mechanically or electronically. For example, the term "module" disclosed herein may indicate a device that includes at least one of application specific integrated circuit (ASIC), field programmable gate arrays (FPGAs), and a programmable-logic device, which are known or will be developed.

At least part of the device (e.g., modules or functions thereof) or method (e.g., operations) according to an embodiment of the present disclosure may be implemented as commands stored, e.g., in the form of a program module, in a non-transitory computer-readable storage medium. In a case where commands are executed by at least one processor, the at least one processor may perform a particular function corresponding to the commands. The non-transitory computer-readable storage medium may be, for example, a memory. At least some of the program module may be implemented (e.g., executed) by, for example, the at least one processor. At least some of the program module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a compact disc read only memory (CD-ROM) and a digital versatile disc (DVD), magneto-optical media such as a floptical disk, and hardware devices specially configured to store and perform a program instruction. In addition, the program instructions may include high level code, which may be executed in a computer by using an interpreter, as well as machine codes generated by a compiler. The aforementioned hardware device may be configured to operate as one or more software modules in order to perform the operation of various embodiments of the present disclosure, and vice versa.

A module or programming module according to an embodiment of the present disclosure may include or exclude at least one of the above-described elements or further include another element. The operations performed by the module, programming module or any other element may be executed sequentially, in parallel, repeatedly, or by a heuristic method. Additionally, some operations may be executed in different orders or omitted, or any other operation may be added. Although various embodiments are described above, those skilled in the art will readily appreciate that many modifications are possible without materially departing from the scope of the present disclosure. Accordingly, all such modifications are intended to be included within the scope of the present disclosure as defined by the appended claims and their equivalents.

What is claimed is:

1. An electronic device, comprising:
an antenna;

a radio communication device having a coupler;
a memory; and
a processor which is electrically connected to the radio communication device and the memory,
wherein the memory comprises instructions, executable by the processor, the processor is configured to:
detect a first signal being transmitted and a second signal being received through the antenna using the coupler,
calculate a reflection coefficient of the antenna based on the first signal and the second signal,
determine a signal magnitude and a phase corresponding to the reflection coefficient, and
determine whether the electronic device is being gripped based on the signal magnitude and the phase.

2. The electronic device of claim 1, further comprising a transceiver which is configured to generate and transmit the first signal,
wherein the processor is configured to detect, if the first signal is being transmitted to the antenna via the coupler, the first signal by the coupler.

3. The electronic device of claim 2, wherein the processor is configured to detect, if the second signal received by the antenna is being transmitted to the transceiver via the coupler, the second signal by the coupler.

4. The electronic device of claim 1, wherein the coupler is a bi-directional coupler, and the processor is configured to detect the first signal and the second signal separately by the bi-directional coupler.

5. The electronic device of claim 1, wherein the memory is configured to store a predetermined equation, and the processor is configured to calculate the reflection coefficient of the antenna by substituting values of the first signal and the second signal into the equation.

6. The electronic device of claim 1, wherein the memory is configured to store a lookup table and a gamma chart for determining the signal magnitude and the phase corresponding to the reflection coefficient.

7. The electronic device of claim 1, further comprising a diversity antenna, wherein the processor is configured to:
detect, if the radio communication device is switched from the antenna to the diversity antenna, the first and second signals being transmitted to and from the diversity antenna, and
calculate the reflection coefficient of the diversity antenna based on the first signal and the second signal.

8. The electronic device of claim 7, wherein the processor is further configured to:
determine the signal magnitude and the phase corresponding to the reflection coefficient, and
determine whether an object is approaching the electronic device based on the signal magnitude and the phase.

9. The electronic device of claim 7, wherein the processor is further configured to determine a state of the electronic device based on the reflection coefficients of the antenna and the diversity antenna.

10. The electronic device of claim 1, wherein the processor is configured to enable, if the electronic device is being gripped, an electromagnetic function for reducing electromagnetic wave radiation.

11. A method of grip recognition of an electronic device, the method comprising:
detecting a first signal being transmitted and a second signal being received through an antenna using a coupler;
calculating a reflection coefficient of the antenna based on the first signal and the second signal;
determining a signal magnitude and a phase corresponding to the reflection coefficient; and
determining whether the electronic device is being gripped based on the signal magnitude and the phase.

12. The method of claim 11, wherein detecting the first signal comprises:
generating, at a transceiver of the electronic device, the first signal; and
detecting, if the first signal is being transmitted to the antenna via the coupler, the first signal by the coupler.

13. The method of claim 11, wherein detecting the second signal comprises:
receiving the second signal through the antenna; and
detecting, if the second signal is being transmitted to a transceiver of the electronic device via the coupler, the second signal by the coupler.

14. The method of claim 11, wherein the coupler is a bi-directional coupler configured to detect the first signal and the second signal separately.

15. The method of claim 11, wherein calculating the reflection coefficient comprises calculating the reflection coefficient based on the first signal and the second signal using an equation stored in a memory.

16. The method of claim 11, wherein determining the signal magnitude and the phase corresponding to the reflection coefficient comprises retrieving the signal magnitude and the phase from a lookup table and a gamma chart stored in the memory for use in determining the signal magnitude and the phase.

17. The method of claim 11, further comprising:
switching from the antenna to a diversity antenna;
detecting, if the coupler is switched from the antenna to the diversity antenna, the first signal being transmitted to the diversity antenna;
detecting the second signal being transmitted from the diversity antenna; and
calculating the reflection coefficient of the diversity antenna based on the first signal and the second signal.

18. The method of claim 17, further comprising:
determining the signal magnitude and the phase corresponding to the reflection coefficient; and
determining whether an object is approaching the electronic device based on the signal magnitude and the phase.

19. The method of claim 17, further comprising determining a state of the electronic device based on the reflection coefficients of the antenna and the diversity antenna.

20. The method of claim 11, further comprising enabling, if the electronic device is being gripped, an electromagnetic function for reducing electromagnetic wave radiation.

* * * * *